United States Patent

[11] 3,614,564

[72] Inventors: Tetsuji Hirotsu, Katsuta-shi; Hisao Sonobe, Ibaraki-ken, both of Japan
[21] Appl. No.: 842,933
[22] Filed: July 18, 1969
[45] Patented: Oct. 19, 1971
[73] Assignee: Hitachi, Ltd. Tokyo, Japan
[32] Priority: July 22, 1968
[33] Japan
[31] 43/51208

[54] READHESION APPARATUS FOR VEHICLES
9 Claims, 4 Drawing Figs.
[52] U.S. Cl. .................................................. 318/52
[51] Int. Cl. ........................................ B61c 15/12, H02p 5/50
[50] Field of Search ......................................... 318/52

[56] References Cited
UNITED STATES PATENTS
3,364,406  1/1968  Watanabe ...................... 318/52
3,378,743  4/1968  Weiser ........................... 318/52

Primary Examiner—Oris L. Rader
Assistant Examiner—Thomas Langer
Attorney—Craig, Antonelli, Stewart & Hill ABSTRACT: A readhesion apparatus for vehicles for detecting an increment of velocity resulting from a slip caused to a vehicle wheel adapted to make the output of a driving motor follow a reference value, applying the detected value to a transducer which exhibits different time constants when input variation is increasing and when it is decreasing, and reducing the reference value in accordance with an output from said transducer, whereby readhesion of the wheel is enhanced.

3,614,564

READHESION APPARATUS FOR VEHICLES

BACKGROUND OF THE INVENTION

This invention relates to a desirable readhesion apparatus for vehicles in which any slip or skid of a vehicle wheel may be quickly suppressed and the vehicle wheel which is slipping or spinning may be brought into state where it has traction without decreasing the tractive effort and braking force of the vehicle to an unnecessary degree.

It is well known that the nonadhesion of a wheel such as slip or skid occurs when the tractive effort or braking force of the vehicle exceeds the limit of adhesion. In other words, a slip takes place when the tractive effort of the vehicle exceeds the limit of adhesion or during the acceleration of the vehicle. Similarly, a skid of the vehicle takes place when the braking force exceeds the limit of adhesion or during the deceleration of the vehicle.

Such a nonadhesion as slip or skid is a very undesirable phenomenon, as it not only lowers the tractive effort and braking force of a vehicle but also injures wheels and rails.

In order to suppress the nonadhesion phenomenon it is usually the practice to reduce the tractive effort or braking force of the axle which is in such a nonadhesion state. After readhesion is obtained thereby, the tractive effort or braking force thus reduced is again increased to return to its original value.

In the apparatuses according to the prior art, the recovery of readhesion and the subsequent recovery of tractive effect or braking force to its original value was governed entirely by the characteristics of the control system.

For example, in an electric vehicle having a control system adapted to cause motor current to follow a predetermined value through a negative feedback control, a certain degree of time lag is imparted to the control system to enhance its control performance. This causes a relatively long time to be required to reduce the reference value upon occurrence of a nonadhesion phenomenon and thereby reduce the motor current, and in the meanwhile the nonadhesion condition develops; and even if readhesion is achieved, another long time is required to bring the tractive effort or braking force to its original value. This results in an unnecessary decrease in the tractive effort or braking force of the electric vehicle.

In order to obviate the above-described inconvenience, an additional control system adapted to operate only when nonadhesion is detected is provided to decrease the motor current very quickly. However, the use of such an additional control system causes the motor current to increase as fast after readhesion as it was decreased before, and this in turn leads to result that a motor current assumes a value exceeding its original value, that is, a phenomenon known as overshoot occurs. Such an overshoot acts to bring the vehicle wheel again into the nonadhesion state after readhesion has been achieved.

These are the problems usually encountered by all prior art apparatuses.

SUMMARY OF THE INVENTION

It is therefore an object of the present invention to provide a readhesion apparatus for vehicles for ensuring the early suppression of any nonadhesion of vehicle wheels and enhancing the desirable readhesion of the wheels.

It is another object of the present invention to provide a readhesion apparatus for vehicles which is capable of said early suppression and desirable readhesion in the event of any type of nonadhesion.

A feature of the present invention lies in detecting a quantity depending on the variation in axle velocity caused when a wheel is brought from adhesion state to nonadhesion state, and applying the detected output through a transducer having a predetermined conversion characteristic so as to reduce the reference value commanding the output of a vehicle driving motor by the output of said transducer.

Another feature of the present invention lies in that in the detection of the quantity depending on the variation in axle velocity, a quantity proportional to the variation, a quantity proportional to the differential quantity thereof or the like is used individually or in combination to thereby provide a more effective early suppression of nonadhesion than achieved by the prior art.

A further feature of the present invention lies in a much more simplified construction of the transducer.

These and other objects and features of the present invention will become fully apparent from the following description taken in conjunction with the accompanying drawings showing embodiments of the invention, in which:

DETAILED DESCRIPTION OF THE PREFERRED EMBODIMENTS

Figure 1:
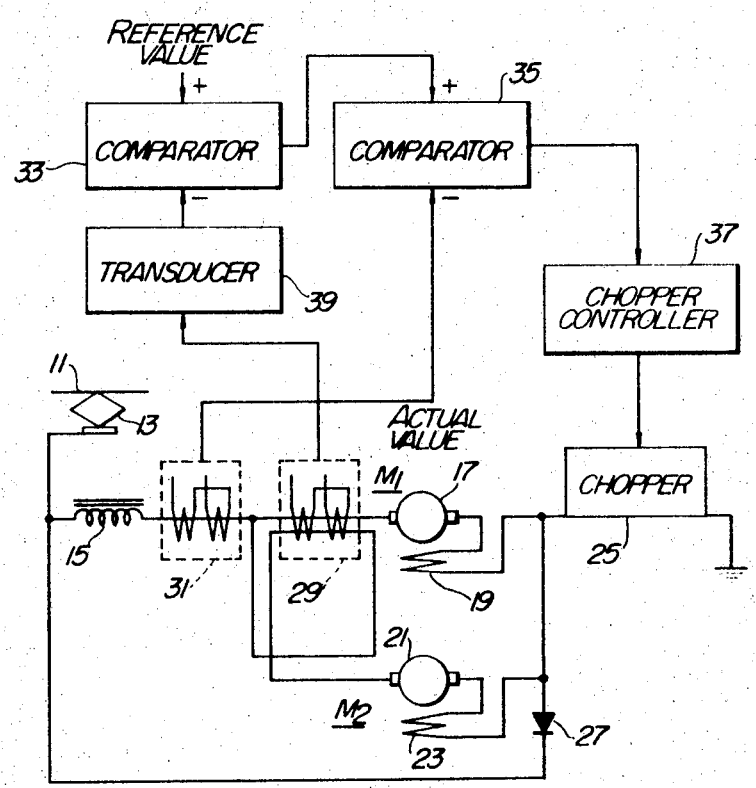
FIG. 1 is a block diagram showing the apparatus according to an embodiment of the present invention.

Referring to FIG. 1, there is shown a block diagram of a main circuit and control system in an electric vehicle incorporating the present invention. The main circuit includes a contact wire 11 energized by a required DC source, a pantagraph 13 for introducing power from the contact wire 11 into an electric vehicle, and a smoothing reactor 15 for smoothing motor current.

Main motors $M_1$ and $M_2$ comprising armatures 17 and 21 and field windings 19 and 23 are connected together in parallel.

A chopper 25 is connected in series with the main motor circuit. The chopper 25 is a kind of switching circuit which intermittently controls the voltages applied to the main motors. A flywheel diode 27 is provided to convert the motor currents from main motors $M_1$ and $M_2$ into a direct current. A slip detector 29 is also provided which comprises a direct current transformer for detecting a current difference between main motors $M_1$ and $M_2$. Another direct current transformer 31 is provided to detect the total current of the motors.

The control circuit for the above-described main circuit includes comparators 33 and 35 and chopper controller 37, all of which are of known construction. The control circuit further includes a transducer 39 provided according to the present invention, of which the detailed circuit arrangement and operation will be described later.

Description will now be made of the normal slip-free operation of the main motors $M_1$ and $M_2$.

The aforementioned chopper and the electric vehicle utilizing the same have already been described in various references (for example, "I.E.E.E. Transactions on Communication and Electronics" July 1964, pp. 390–399 or "Elektrische Bahnen" Heft 10 (35, Jahrgang 1964), pp. 294–301), and therefore description will be made only briefly herein of such chopper and vehicle.

The chopper 25 repeats its ON-OFF action in a predetermined operation cycle. The ratio of ON time $T_{on}$ to the operation cycle T is referred to as the "on time ratio" or "transformation ratio," which is represented by $\gamma$.

In the main circuit of FIG. 1, when the chopper 25 is controlled by an ON time ratio $\gamma$, and if $E_s$ is the voltage of the contact wire 11, the average value $E_m$ of the voltages applied to the main motors $M_1$ and $M_2$ will be:

$$E_m = \gamma E_s$$

Hence, the voltages applied to the main motors $M_1$ and $M_2$ may be controlled by controlling the ON time ratio $\gamma$.

When there is no slip, in the wheels there is no difference between the motor current of the main motor $M_1$ and that of the main motor $M_2$, and thus the output of the slip detector 29 is zero. Accordingly, no output is produced from the transducer 39.

The motor current is used as the reference value. Because there is no output from the transducer 39, the output of the comparator 33 is equal to the reference value. Therefore, the output of the comparator 35 is the deviation of the actual value of the motor current for the reference value.

The chopper controller 37 determines the ON time ratio $\gamma$ of the chopper 25 in accordance with the deviation, whereby the chopper 25 is controlled When starting the electric vehicle of the above-described construction, the starting is effected by reducing the ON time ratio $\gamma$ of the chopper 25 to a small value because the counter electromotive force of the main motors $M_1$ and $M_2$ is zero, and as the velocity of the main motors $M_1$ and $M_2$ increases and their counter electromotive force also increases, a predetermined motor current flows to produce a required tractive effort.

While the present invention has been described with respect to a DC electric vehicle incorporating the chopper control, it is also applicable in other types of vehicle.

For example, the present invention can be applied in an AC electric vehicle in which AC voltage is made into an invariable voltage by phase control so as to control the voltages applied to the main motors or in a diesel electric vehicle in which generated power is controlled by the field control of the generator so as to control the voltages applied to the main motors.

Thus, the present invention can be applied in ordinary vehicles having a control system in which a reference value is commanded to a controller for means for providing tractive effort or braking force to wheels and thereby the actual value provided by said means is controlled so as to follow the reference value.

Any slip occuring in the electric vehicle as show in FIG. 1 can be detected in the following manner. If, for example, the driving wheel driven by the main motor $M_1$ slips, the counter electromotive force of the main motor $M_1$ increases to thereby decrease the motor current thereof.

At this time, motor currents flow in opposite directions through two conductors of the main circuit extending through the direct current transformer constituting the slip detector 29, so that unbalance is created between the magnetic fluxes produced by the two conductors and the deviation therebetween may be thus detected.

The output of the slip detector 29 is proportional to said deviation and the main motor $M_2$ is adhesive, and therefore the deviation is substantially proportional to an increment of velocity of the main motor $M_1$ gained by the slip, that is, a slip velocity of the main motor $M_1$.

The aforementioned deviation also takes place when a skid occurs in one of the main motors $M_1$ and $M_2$, and this can be detected just in the same way as in the case of slip.

The detection of slip can also be accomplished by comparing any two armature voltages of the two main motors or by the output of a tachogenerator provided on an axle.

As is well known, the two forms of nonadhesion such as slip and skid are essentially the same phenomena, and the countermeasures to be taken for these phenomena may also be the same.

Figure 2:
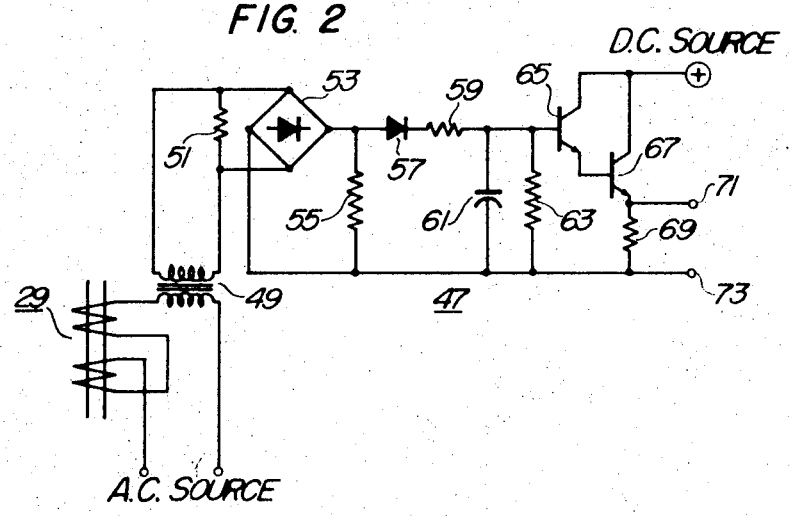
FIGS. 2 and 3 are detailed circuit diagrams showing different examples of the transducer circuit used with the apparatus of FIG. 1.

The construction shown in FIG. 1 is characterized by the action of the transducer 39, which is more fully shown in FIG. 2.

The slip detector 29 consists chiefly of a direct current transformer, the output of which is taken out through a transformer 49 and thereby an AC voltage proportional to the slip velocity appears across a resistor 51.

This AC voltage is rectified by a diode bridge 53 so that a DC voltage proportional to the slip velocity appears across a resistor 55.

The voltage appearing across the resistor 55 is applied through a diode 57 and a resistor 59 to a capacitor 61 which is thereby electrically charged. With the increase of the slip velocity, the capacitor 61 is charged up to the maximum value of voltage drop appearing across the resistor 55, while the charge stored in the capacitor 61 is discharged to a resistor 63 when the voltage drop starts to become lower than the maximum value with the decrease of the slip velocity which has once reached its peak.

A voltage appearing across a resistor 63 is amplified by a Darlington connection of transistors 65 and 67. Since this transistor circuit constitutes an emitter follower by a resistor 69, it is a matter of course that the resistor 69 is related to the discharge of the capacitor 61. Thus, between terminals 71 and 73 there is obtained an output which is very quick to rise and slow to fall.

Such a circuit enables the time constants for the charging and discharging of the capacitor 61 to be selected as desired. According to the experiments carried out by the inventors, the time constant for charging was about 10 milliseconds and that for discharging was about 2 seconds.

Usually the time constant for charging of the capacitor 61 should be selected to be smaller than that for discharging, and further should be selected to be much smaller than the conceivable value of the time constant during the rising of the slip velocity. The time constant for discharging should desirably be great enough to achieve readhesion with a sufficient stability.

In the circuit of FIG. 2 in which the values of the various elements are selected as described above, the voltage appearing between the terminals 71 and 73 is such that it increases with the rising of the slip velocity and thereafter, when the slip velocity reaches its maximum value and starts to decrease, that voltage starts to decrease at a predetermined time constant independently of the tendency of decrease in the slip velocity. This voltage is the output of the transducer 39.

Description will now be made of the operation of the FIG. 1 apparatus provided with the transducer 39 having the foregoing characteristics.

Any slip occuring in the motor circuit will be detected by the slip detector 29. The output of the slip detector 29 provides the input of the transducer 39, which input will be converted into said predetermined variation at the transducer 39, where the input is passed to the comparator 33 as the output of the transducer 39.

Figure 4:
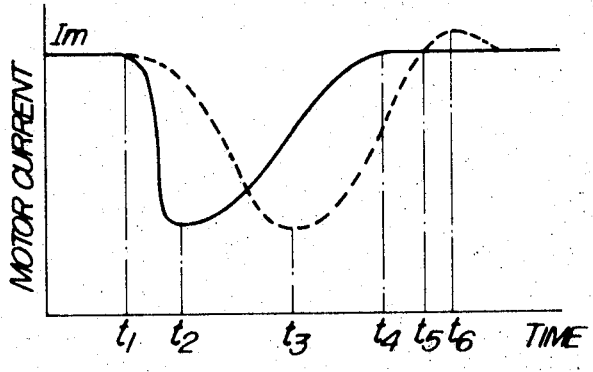
FIG. 4 is a graph for illustrating the operation of the FIG. 1 apparatus.

As a result, if a slip occurs, the reference value of the voltage entering the comparator 35 will vary as shown by the solid line in FIG. 4.

Since the motor current decreases following the reference value, the tractive effort generated by the main motors $M_1$ and $M_2$ will also decrease to thereby allow the readhesion of the slipping wheel to be accomplished.

When a slip occurs, the time during which the reference value is reduced should preferably be as short as possible in order to suppress the increase of the slip velocity. For this purpose the circuit shown in FIG. 3 employs the differential value of the output of the slip detector 29.

Figure 3:
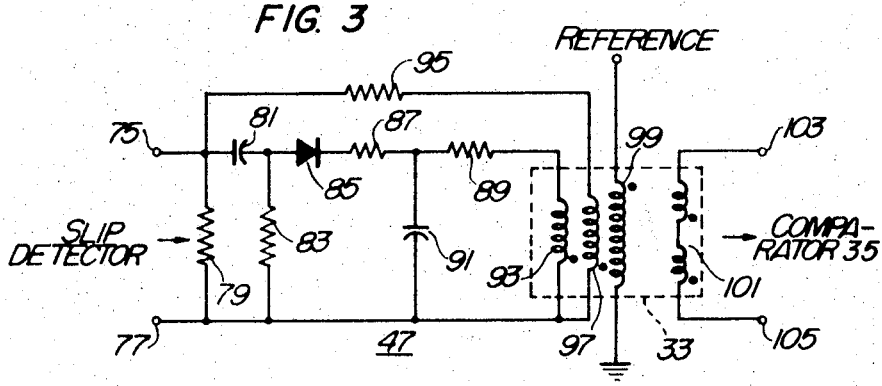

Referring to FIG. 3, which illustrates a second embodiment of the transducer 39, the output of the slip detector 29 is applied to terminals 75 and 77. As a result of this, a voltage proportional to the slip velocity appears across a resistor 79. This voltage is a rectified DC voltage as is the case with the voltage appearing across the resistor 55 of FIG. 2.

A capacitor 81 and a resistor 83 together constitute a differentiation circuit. A diode 85, resistors 87 and 89 and a capacitor 91 together constitute a time constant circuit. In this case, therefore, the capacitor 91 is charged until the positive peak of the differential value of the slip velocity is reached. Thereafter the voltage varies in accordance with the time constants of the resistor 89 and capacitor 91.

A current corresponding to this voltage variation passes into one of the control windings 93 of a magnetic amplifier constituting the comparator 33. This enables the reference value to be reduced very fast after the slip has been detected, and further enables the reference value to be returned to its original value with a predetermined tendency by suitably selecting the time constants for the resistor 89 and capacitor 91.

When the slip detection is effected by the use of the differential value alone, the detection may sometimes fail for a slip of the type which gradually increases with a gentle slope, because the differential value is very small in such a case.

To compensate for such a failure, in the circuit of FIG. 3, another control winding 97 of the magnetic amplifier is energized by a voltage appearing across the resistor 79 and proportional to the slip velocity, through the resistor 95.

The two control windings 93 and 97 are mounted on an iron core in such a manner as to provide fluxes of the same polarity. The other control winding 99 is mounted in such a manner as to provide a flux of the opposite polarity to said two windings 93 and 97, and a current proportional to the reference value passes thereinto.

Thus, at output terminals 103 and 105 of an output winding 101 of the magnetic amplifier there is obtained a reference value reduced upon occurrence of a slip, and this reference value becomes the input of the comparator 35.

As has hitherto been discussed, the present invention enables the desirable readhesion of vehicle wheels to be effected in the manner illustrated in FIG. 4.

Assume that a slip occurs at a point of time $t_1$ in the electric vehicle which is running at a motor current $I_m$. If control is first effected as shown by the dotted line in FIG. 4, the motor current will start to decrease at the point of time $t_1$, and will reach its minimum value at a point of time $t_3$. At this point the slipping wheel is brought into a readhesion state. After the point of time $t_3$ is passed, the tractive effort is returned to its original value.

In the above-described variation of the motor current, the time constants for the downward variation and the upward variation are substantially equal. The motor current returns to its original value at a point of time $t_5$, but if this return is effected quickly, there will be caused an overshoot as a point of time $t_6$.

If the rail condition is bad in this case, the wheel will again slip. For this reason, the above-described manner of control is not desirable.

On the other hand, when a slip is detected at the point of time $t_1$, as shown by the solid line in FIG. 4, the motor current is immediately reduced to bring the slipping wheel into readhesion state at the point of time $t_2$. After the point of time $t_2$ is passed, the motor current is gradually increased to return to its original value at a point of time $t_2$. In this case, the tractive effort can be satisfactorily returned to its original value without any overshoot being caused in the motor current.

What is claimed is:

1. A readhesion apparatus for vehicles comprising:
   first means for detecting a quantity depending on an axle velocity variation produced when a wheel shifts from adhesion state into nonadhesion state, applying said detected value to a transducer, and reducing a reference value in accordance with an output obtained from said transducer;
   second means for detecting an output of a vehicle drive motor and comparing the detected output with said reduced reference value third means for applying a signal from said second means to said driving motor to thereby control the output of said vehicle driving motor so that it follows said reduced reference value, said transducer exhibiting a first very small time constant when input variation is increasing and a second time constant sufficiently greater than said first time constant when said input variation is decreasing.

2. A readhesion apparatus for vehicles according to claim 1, wherein said quantity depending on the axle velocity variation is a quantity depending on a deviation between the quantities of electricity related to the respective velocities of an adhesion axle and a nonadhesion axle.

3. A readhesion apparatus for vehicles according to claim 2, wherein said quantity depending on said deviation is the differential value of said deviation.

4. A readhesion apparatus for vehicles according to claim 2, wherein said quantity on said deviation is the sum of said deviation and the differential value thereof.

5. A readhesion apparatus for vehicles according to claim 1, wherein said transducer includes a capacitor having a charging circuit comprising a resistor providing said first time constant and a diode inserted so as to assume the forward direction with respect to charging current, and a discharging circuit comprising a resistor providing said second time constant.

6. A traction control apparatus for regulating the power supplied to motor driven vehicle wheels to maintain said wheels in a traction condition comprising traction detection means for generating a slip signal having a value corresponding to a detected amount of slip in a vehicle wheel, first means for adjusting the value of a reference signal in accordance with the value of said slip signal, and control means for controlling the output of the driving motor for said vehicle wheel in accordance with the difference between said adjusted reference signal and the output of said driving motor, said first means providing a very small time constant for increasing values of said slip signal and a relatively greater time constant for decreasing values of said slip signal.

7. A traction control apparatus as defined in claim 6, wherein said first means includes a transducer connected to the output of said traction detection means for converting said slip signal to a control signal varying in accordance with the time constant of the transducer and a first comparator for adjusting the value of a reference signal in accordance with the value of said control signal, said control means including a second comparator connected to the output of said first comparator and a current detector applying an output corresponding to the driving current of said motor to said second comparator, the output of said second comparator providing a signal for controlling the power supplied to said driving motor.

8. A traction control apparatus as defined in claim 7, wherein said transducer comprises a capacitor connected to a charging resistor and a discharging resistor, said discharging resistor being connected to a pair of transistors connected in Darlington configuration, said charging and discharging resistors having different values.

9. A traction control apparatus as defined in claim 7, wherein said transducer comprises a capacitor connected to a charging resistor and a discharging resistor, said first comparator comprising a magnetic amplifier having a first winding connected to said discharging resistor, a second winding connected to the input of said transducer through a feedback resistor, a third winding connected to said reference signal and an output winding, said charging and discharging resistors having different values.